(12) United States Patent
Dargavell et al.

(10) Patent No.: US 10,449,885 B2
(45) Date of Patent: *Oct. 22, 2019

(54) DEVICE FOR HOLDING A CONTAINER

(71) Applicant: Inoac USA, Inc., Troy, MI (US)

(72) Inventors: Andrew L. Dargavell, Oxford, MI (US); James V. Gorman, Holly, MI (US)

(73) Assignee: INOAC USA, INC., Troy, MI (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/483,207

(22) Filed: Apr. 10, 2017

(65) Prior Publication Data

US 2017/0274807 A1 Sep. 28, 2017

Related U.S. Application Data

(63) Continuation of application No. 14/690,841, filed on Apr. 20, 2015, now Pat. No. 9,643,525.

(51) Int. Cl.
*B60N 3/10* (2006.01)
*A47G 23/02* (2006.01)

(52) U.S. Cl.
CPC .............. *B60N 3/106* (2013.01); *A47G 23/02* (2013.01); *B60N 3/105* (2013.01)

(58) Field of Classification Search
CPC ............... A47G 23/02; A47G 23/0208; A47G 23/0216; B60N 3/106; B60N 3/105; B60N 3/10; B60N 3/108
See application file for complete search history.

(56) References Cited

U.S. PATENT DOCUMENTS

| | | | |
|---|---|---|---|
| 4,645,157 A | 2/1987 | Parker | |
| 4,892,281 A | 1/1990 | DiFilippo et al. | |
| 5,072,989 A | 12/1991 | Spykerman et al. | |
| 5,087,008 A | 2/1992 | Miller et al. | |
| 5,104,184 A | 4/1992 | Kwasnik et al. | |
| 5,104,185 A | 4/1992 | Christiansen et al. | |
| 5,104,186 A | 4/1992 | Kwasnik et al. | |
| 5,104,187 A | 4/1992 | Fischer et al. | |
| 5,131,716 A | 7/1992 | Kwasnik et al. | |
| 5,170,980 A | 12/1992 | Burrows et al. | |
| 5,259,580 A | 11/1993 | Anderson et al. | |
| 5,289,962 A | 3/1994 | Tull et al. | |

(Continued)

*Primary Examiner* — James N Smalley
*Assistant Examiner* — Madison L Poos
(74) *Attorney, Agent, or Firm* — Dykema Gossett PLLC

(57) ABSTRACT

A device for holding a container is disclosed. The device includes a base configured to support the container, a retaining mechanism configured to retain the container relative to the base, and an actuator mechanism coupled to the retaining mechanism. The retaining mechanism includes a longitudinal axis and an iris moveable between an insertion position and a retaining position. A central opening formed by the iris in the insertion position has an insertion diameter greater than a retaining diameter of the central opening formed by the iris in the retaining position. The iris includes a plurality of arms arranged in a first level and a second level. User rotation of the actuator mechanism in a first direction causes the arms of the iris to move to the retaining position, and user rotation of the actuator mechanism in a second direction opposite the first direction causes the arms of the iris to move away from the retaining position towards the insertion position.

24 Claims, 13 Drawing Sheets

(56) References Cited

U.S. PATENT DOCUMENTS

| | | |
|---|---|---|
| 5,342,009 A | 8/1994 | Lehner |
| 5,505,516 A | 4/1996 | Spykerman et al. |
| 5,680,974 A | 10/1997 | Vander Sluis |
| 5,749,554 A | 5/1998 | Avila et al. |
| 5,918,949 A | 7/1999 | Bliss |
| 6,758,452 B1 | 7/2004 | Salenbauch et al. |
| 6,779,770 B2 | 8/2004 | Kaupp |
| 6,837,408 B2 | 1/2005 | Dieringer |
| 6,843,397 B2 | 1/2005 | Then et al. |
| 7,121,517 B2 | 10/2006 | Oana |
| 7,487,946 B2 | 2/2009 | Thomas |
| 7,597,300 B2 | 10/2009 | Harada |
| 7,611,115 B2 | 11/2009 | Kniazyszcze et al. |
| 7,677,590 B2 | 3/2010 | Dotsey et al. |
| 7,878,472 B2 | 2/2011 | Lackore |
| 8,245,894 B2 | 8/2012 | Buehler |
| 8,695,843 B1 | 4/2014 | Brinas |
| 2006/0201273 A1 | 9/2006 | Beckley |
| 2008/0099505 A1 | 5/2008 | Lawlor |
| 2010/0078531 A1 | 4/2010 | Boinais |

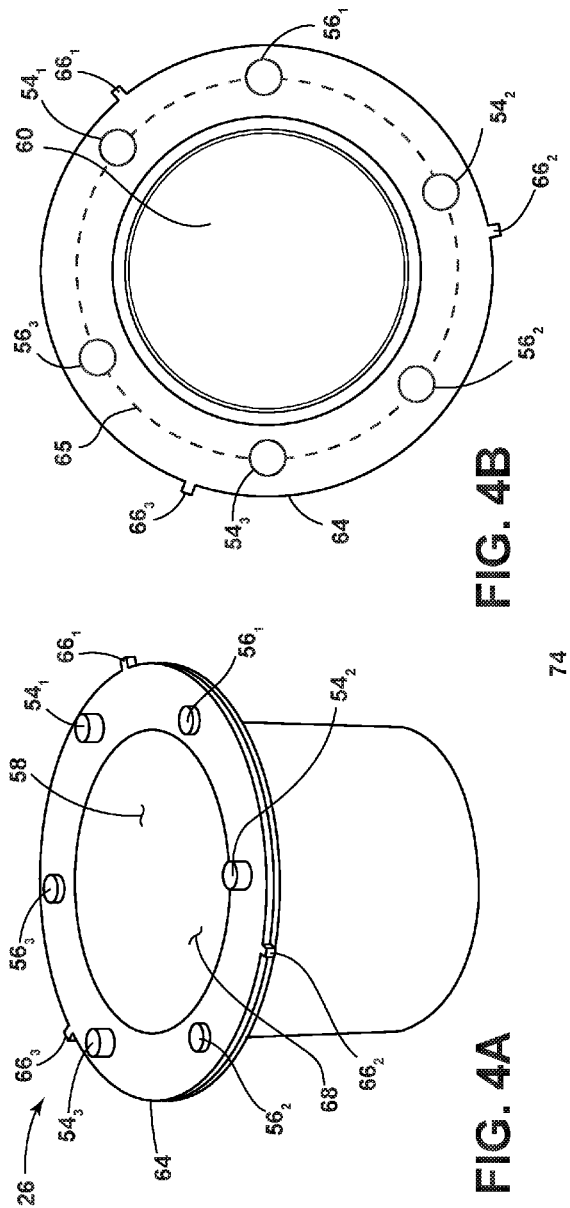
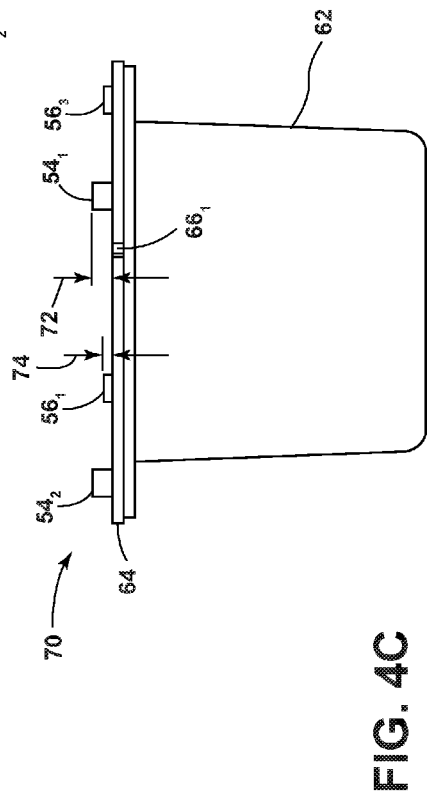
FIG. 4A
FIG. 4B
FIG. 4C

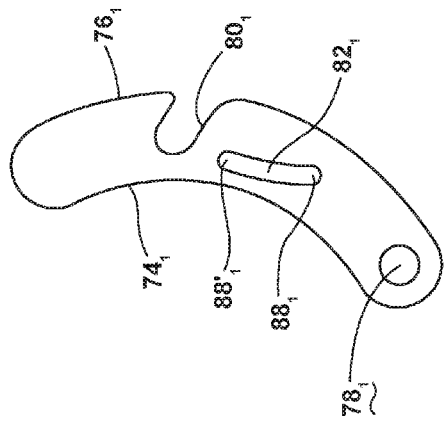
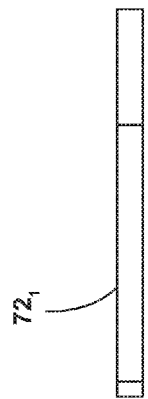
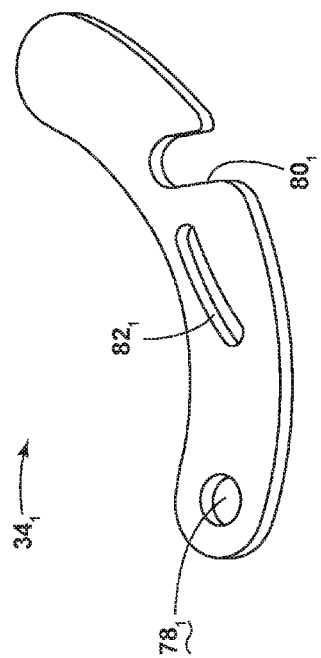
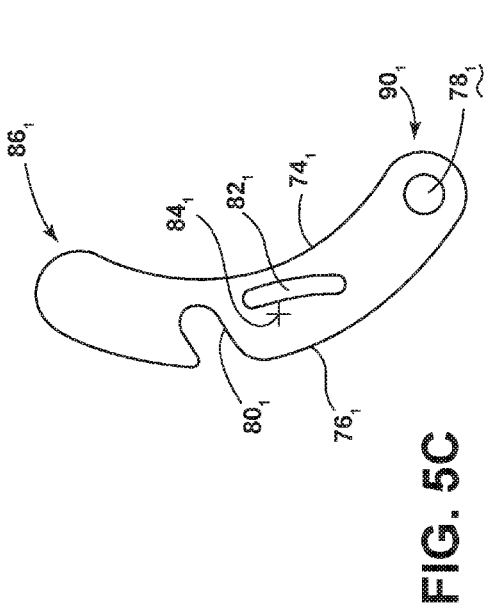
FIG. 5A
FIG. 5B
FIG. 5C
FIG. 5D

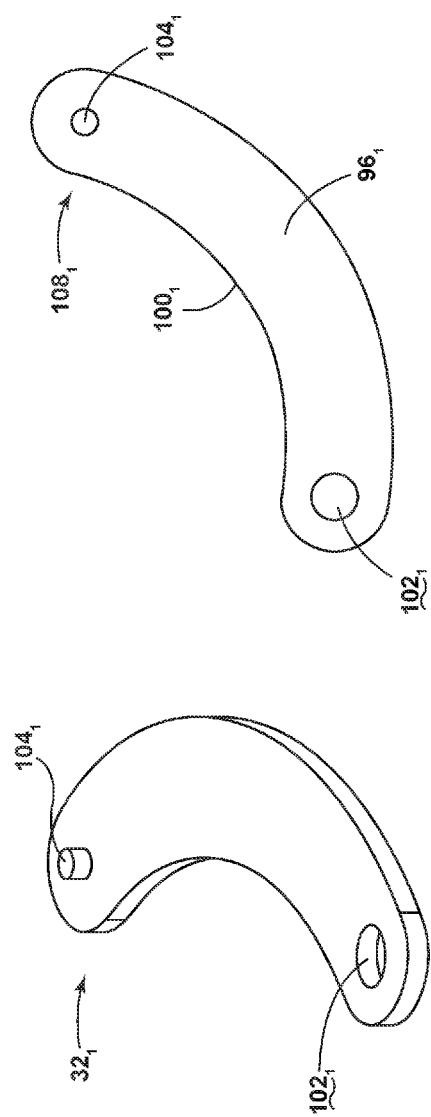
FIG. 6A
FIG. 6B
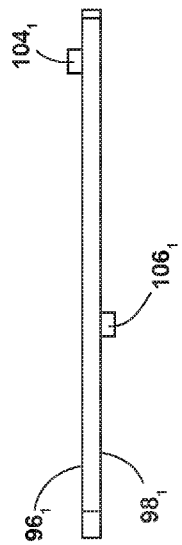
FIG. 6D
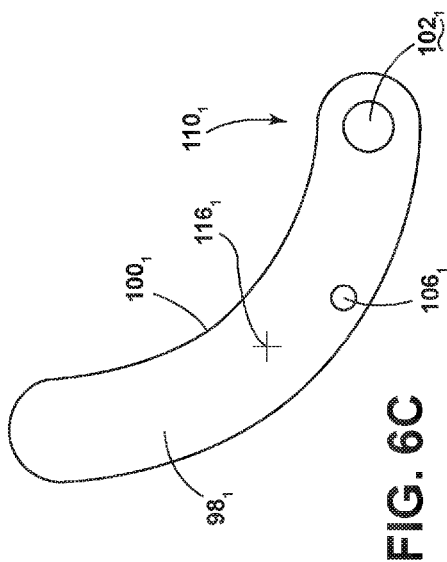
FIG. 6C

DEVICE FOR HOLDING A CONTAINER

CROSS-REFERENCE TO RELATED APPLICATION

The present application is a continuation of U.S. application Ser. No. 14/690,841, filed Apr. 20, 2015, which is hereby incorporated by reference as though fully set forth herein.

BACKGROUND a. Technical Field

The disclosure relates generally to vehicle components, and more particularly, to a device for holding a container.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

There are several devices for holding containers (e.g., cupholders) for use in vehicles, such as automobiles, aircrafts, and strollers. Some devices contain spring-loaded retainers that protrude through the sidewalls of the device and that are limited in how far they can extend. Moreover, these spring mechanisms may sacrifice stability by providing only point contacts on the container toward the base of the container (rather than the top). Also, greater spring forces may have a tendency to indent or distort softer containers like Styrofoam or thin-walled plastic bottles, while lesser spring forces may offer little resistance to tipping of large containers.

Rubber or elastomer-type cupholder inserts with local, deformable extensions to secure the container may be more robust (with respect to tipping), but may have different issues. For example, because of the higher surface friction between the inserts and the container, a greater force is required to insert and remove the container from the holder. The rubber insert may tend to come out with the container, or the beverage may be spilled when the container finally dislodges from the rubber retainer (as the user may not be able to stop the momentum). The rubber inserts may also cause the user to collapse a weaker container due to the grip force required to remove it from the holder. Another issue with rubber inserts is that the lid may be inadvertently removed from the cup when the user attempts to remove the cup from the holder (i.e., the lid comes up with the user's hand). Improvements are, therefore, desired to address these challenges. Among other things, the instant disclosure seeks to improve upon the aforementioned issues.

The foregoing discussion is intended only to illustrate the present field and should not be taken as a disavowal of claim scope.

SUMMARY

In an embodiment, a device for holding a container includes a base configured to support the container, a retaining mechanism configured to retain the container relative to the base, and an actuator mechanism coupled to the retaining mechanism. The retaining mechanism includes a longitudinal axis and an iris moveable between an insertion position and a retaining position. A central opening formed by the iris in the insertion position has an insertion diameter greater than a retaining diameter of the central opening formed by the iris in the retaining position. The iris includes a plurality of arms arranged in a first level and a second level. User rotation of the actuator mechanism in a first direction causes the arms of the iris to move to the retaining position, and user rotation of the actuator mechanism in a second direction opposite the first direction causes the arms of the iris to move away from the retaining position towards the insertion position.

An advantage of the embodiments described herein is that the device can accommodate containers with various diameters as per the user's desire (i.e., device is user-adjustable). Additionally, the device closes the clearance between the container and sidewall of the device, which generates a clean appearance from above and prevents objects from getting between them. Furthermore, the devices described herein allow for greater surface contact with the container, and the contact surfaces are more uniformly distributed about the circumference of the container farther away from the base of the container. In additional embodiments, for vehicles equipped with heated and/or cooled cupholders, the devices described herein help to minimize convective heat dissipation by closing off an area around the container. These advantages aid in improving the aforementioned issues.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 4A is an isometric view of a receptacle of the device of FIG. 1.

FIG. 4B is a top plan view of the receptacle of FIG. 4A.

FIG. 4C is a side view of the receptacle of FIG. 4A.

FIG. 5A is an isometric view of an arm of the device of FIG. 1.

FIG. 5B is a top plan view of the arm of FIG. 5A.

FIG. 5C is a bottom plan view of the arm of FIG. 5A.

FIG. 5D is a side view of the arm of FIG. 5A.

FIG. 6A is an isometric view of another arm of the device of FIG. 1.

FIG. 6B is a top plan view of the arm of FIG. 6A.

FIG. 6C is a bottom plan view of the arm of FIG. 6A.

FIG. 6D is a side view of the arm of FIG. 6A.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
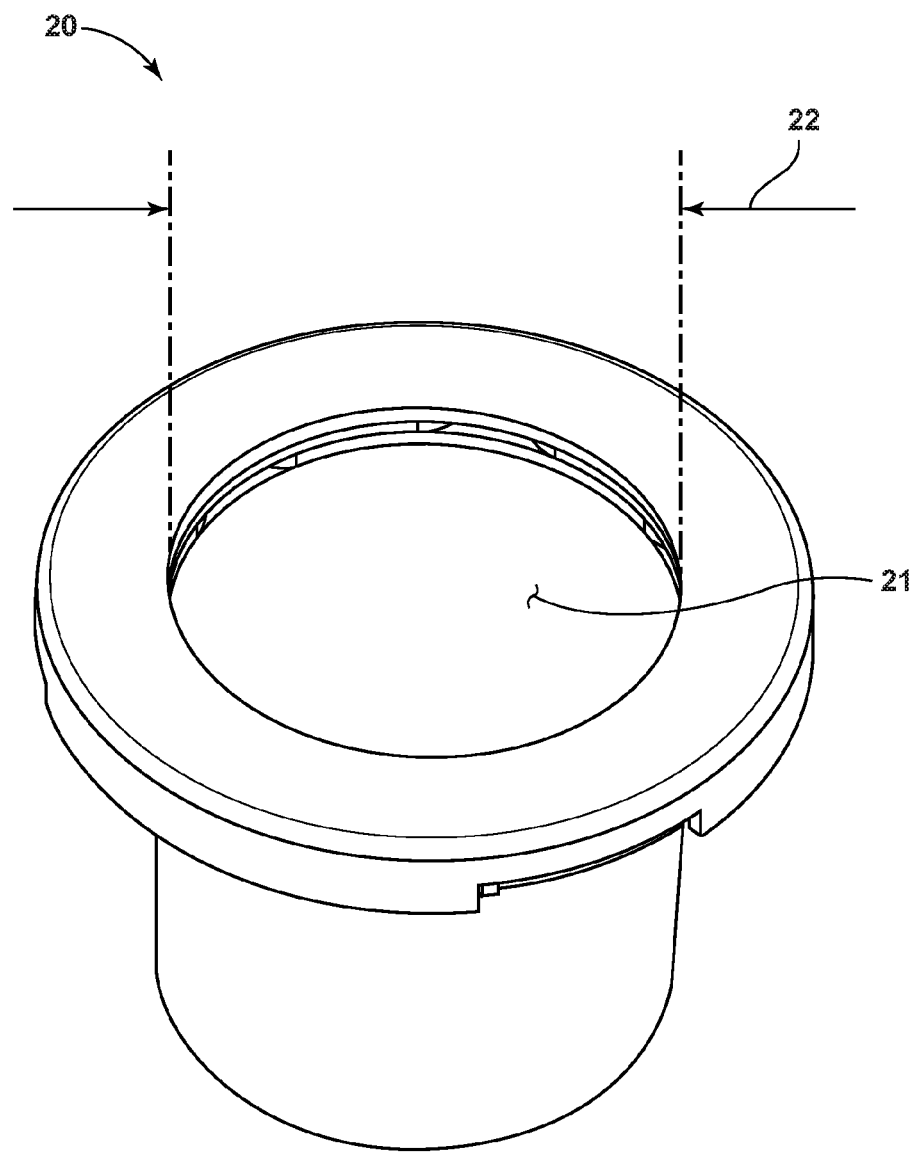
FIG. 1 is an isometric view of a device for holding a container, wherein the device is in an insertion position, in accordance with an embodiment of the instant disclosure.
Figure 2:
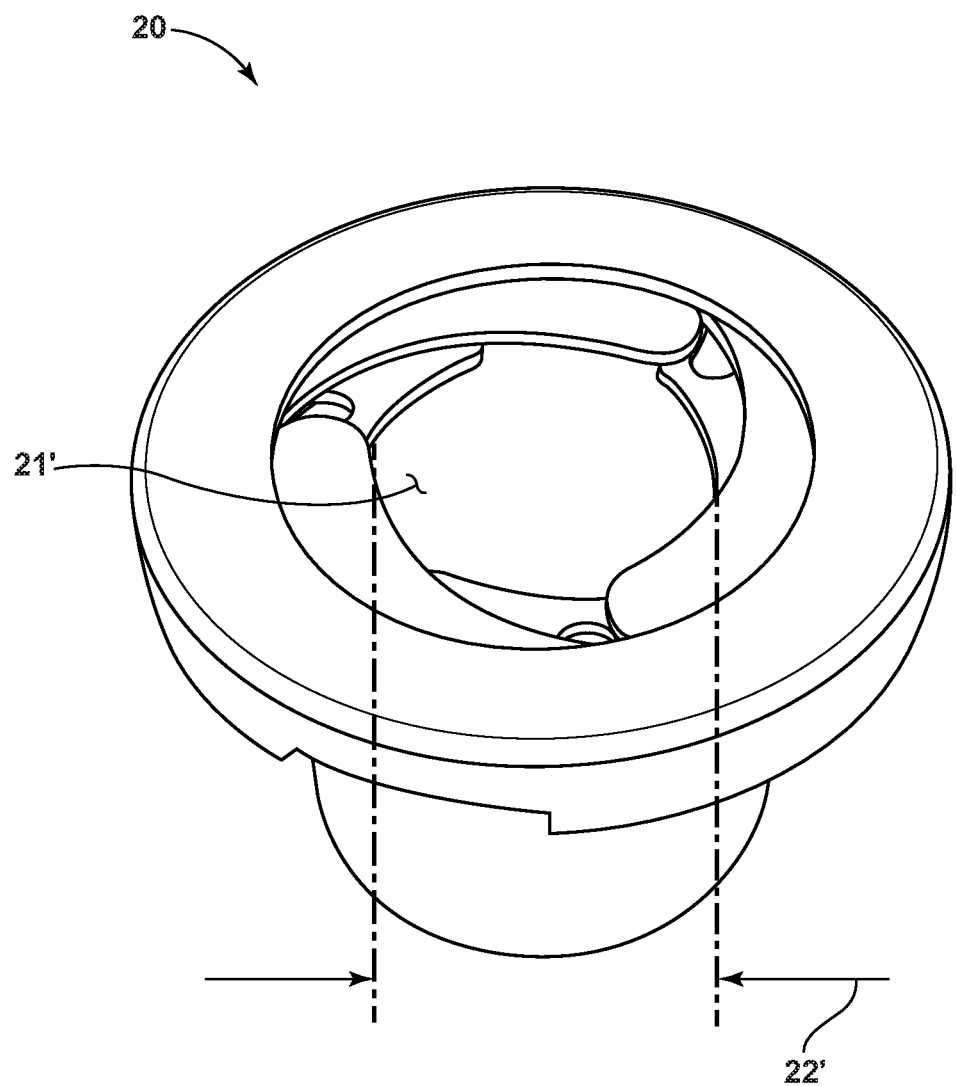
FIG. 2 is an isometric view of the device of FIG. 1 in a retaining position.

Referring now to the drawings wherein like reference numerals are used to identify identical or similar components in the various views, FIG. 1 is an isometric view of a device 20 for holding a container (not shown), wherein device 20 is in an insertion position, in accordance with an embodiment of the instant disclosure. FIG. 2 is an isometric view of device 20 in a retaining position. Device 20 may be configured to move from the insertion position to the retaining position (or any position therebetween) upon actuation by a user or system. Device 20 may also be configured to move from the retaining position to the insertion position (or any position therebetween) upon actuation by a user or system (for example and without limitation, spring-loaded rocker arms or switch activated motor).

Device 20 defines a central opening 21 configured to receive a container or beverage, opening 21 being user-adjustable. As shown in FIGS. 1-2, the size of opening 21 changes as device 20 moves to/from the insertion and retaining positions. When in the insertion position (FIG. 1), opening 21 has an insertion diameter 22; when in the retaining position (FIG. 2), opening 21' has a retaining diameter 22' that is less than insertion diameter 22. As such, device 20 can accommodate containers having diameters associated with the insertion position, the retaining position, or any intermediate position therebetween. Once a container or beverage is inserted into device 20, device 20 may be moved from the insertion position toward the retaining position. Depending on its size, the container or beverage may prevent device 20 from moving completely to the retaining position illustrated in FIG. 2 (i.e., the container may cause device 20 to only reach an intermediate position). Once the device 20 is in the retaining position (or an intermediate position), the container may be removed and re-inserted repeatedly without having to move the device 20 to the insertion position.

Figure 3A:
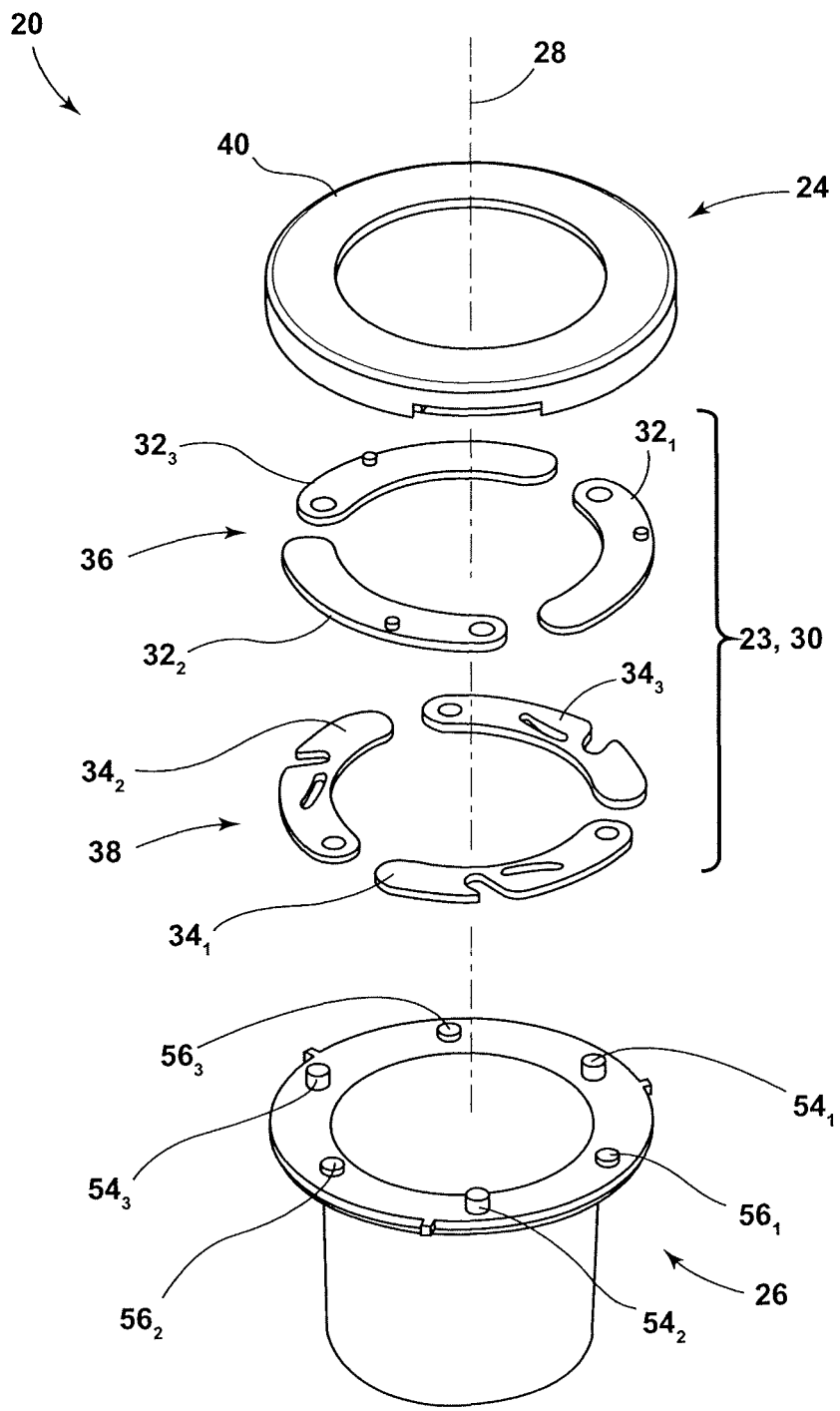
FIGS. 3A-3D are exploded perspective views of the device of FIG. 1 in embodiments.

FIG. 3A is an exploded isometric view of device 20. Device 20 may comprise a retaining mechanism 23, an actuator mechanism 24, and a receptacle 26. Retaining mechanism 23 includes central opening 21 and may comprise a longitudinal axis 28 and an iris 30 movable between the insertion position (FIG. 1) and the retaining position (FIG. 2). Iris 30 may comprise a plurality of arms 32, 34 arranged in levels 36, 38. Arms 32 in level 36 may be axially disposed between actuator mechanism 24 and arms 34 of level 38. Arms 34 of level 38 may be axially disposed between arms 32 of level 36 and receptacle 26. As more particularly shown, arms 32 of level 36 may comprise a plurality of arms $32_{1-3}$, and arms 34 of level 38 may comprise a plurality of arms $34_{1-3}$.

A detailed explanation of the various components of device 20 follows. Thereafter, this disclosure will describe how the various components are assembled to form device 20. Lastly, this disclosure will describe how device 20 operates and how the various components thereof interact with one another.

FIGS. 4A-4C illustrate various views of receptacle 26 of device 20. Receptacle 26 may define an opening 58 and may comprise a base 60, a sidewall 62, a flange 64, pivots $54_{1-3}$, $56_{1-3}$ disposed on flange 64, and stops $66_{1-3}$. Base 60 may be configured to support the container. Sidewall 62 may extend axially from base 60 and may be generally cylindrical in shape. Sidewall 62 defines a cavity 68 in which the container may reside. Flange 64 may be configured to support actuator mechanism 24 and arms $32_{1-3}$, $34_{1-3}$ of iris 30 (shown in FIG. 3A). Flange 64 may be disposed at a longitudinal end 70 of receptacle 26 opposite of base 60. Pivots $54_{1-3}$, $56_{1-3}$ may be generally cylindrical in shape and be arranged equidistantly around a circumference 65 of flange 64. Stops $66_{1-3}$ may be configured to prevent further rotation of actuator mechanism 24. In the illustrated embodiment, stops $66_{1-3}$ project radially outwardly from flange 64 and are arranged equidistantly around the perimeter of flange 64.

FIGS. 5A-5D illustrate various views of arm $34_1$. In the illustrated embodiment, arms $34_{2, 3}$ are identical to arm $34_1$. In other embodiments, however, arms $34_{1-3}$ of level 38 of iris 30 may not be identical to one another (in shape and/or function). Arm $34_1$ is configured to pivot radially inwardly to contact the container. In the illustrated embodiment, arm $34_1$ generally may be curved in shape and may comprise a top surface $72_1$, an inner edge $74_1$ configured to contact the container, an outer edge $76_1$ opposite of inner edge $74_1$, an aperture $78_1$, a slot $80_1$ extending radially inwardly from outer edge $76_1$, and an arm guide $82_1$. Slot $80_1$ may be disposed generally between a midpoint $84_1$ of arm $34_1$ and a longitudinal end $86_1$ of arm $34_1$. Arm guide $82_1$ may have longitudinal ends $88_1$, $88_1'$. Arm guide $82_1$ may also be a through hole and may be disposed between slot $80_1$ and a longitudinal end $90_1$ of arm $34_1$. Arm guide $82_1$ may also be curved. One of ordinary skill in the art will understand that the dimensions, curvature, and positioning of arm guides $82_{1-3}$ may have certain dependencies, namely, the size of arms $32_{1-3}$, $34_{1-3}$, the desired diameters for the retaining and insertion positions, and the effort needed from the user or system to actuate the device, among other things. Moreover, although arm guides $82_{1-3}$ are illustrated as being identical in shape and size, arm guides may be of different shapes and sizes, depending on the actuation desired.

FIGS. 6A-6D illustrate various views of arm $32_1$. In the illustrated embodiment, arms $32_{2,3}$ are identical to arm $32_1$. In other embodiments, however, arms $32_{1-3}$ of level 36 of iris 30 may not be identical to one another (in shape and/or function). Arm $32_1$ is configured to pivot radially inwardly to contact the container. In the illustrated embodiment, arm $32_1$ generally may be curved in shape and may comprise a top surface $96_1$, a bottom surface $98_1$, an inner edge $100_1$ configured to contact the container, an aperture $102_1$, an actuating cam $104_1$ projecting axially upwardly from top surface $96_1$, and an arm cam $106_1$ projecting axially downwardly from bottom surface $98_1$. Actuating cam $104_1$, which may be cylindrical in shape, may be configured to engage with actuator mechanism 24 (shown in FIG. 3A). Actuating cam $104_1$ may be disposed at a longitudinal end $108_1$ of arm $32_1$, and aperture $102_1$ may be disposed at a longitudinal end $110_1$ of arm $32_1$, opposite of longitudinal end $108_1$. Arm cam $106_1$ may be generally cylindrical in shape and may be configured to engage with arm $34_1$ below arm $32_1$. Arm cam $106_1$ may be disposed generally between a midpoint $116_1$ of arm $32_1$ and longitudinal end $110_1$ of arm $32_1$.

Figure 7:
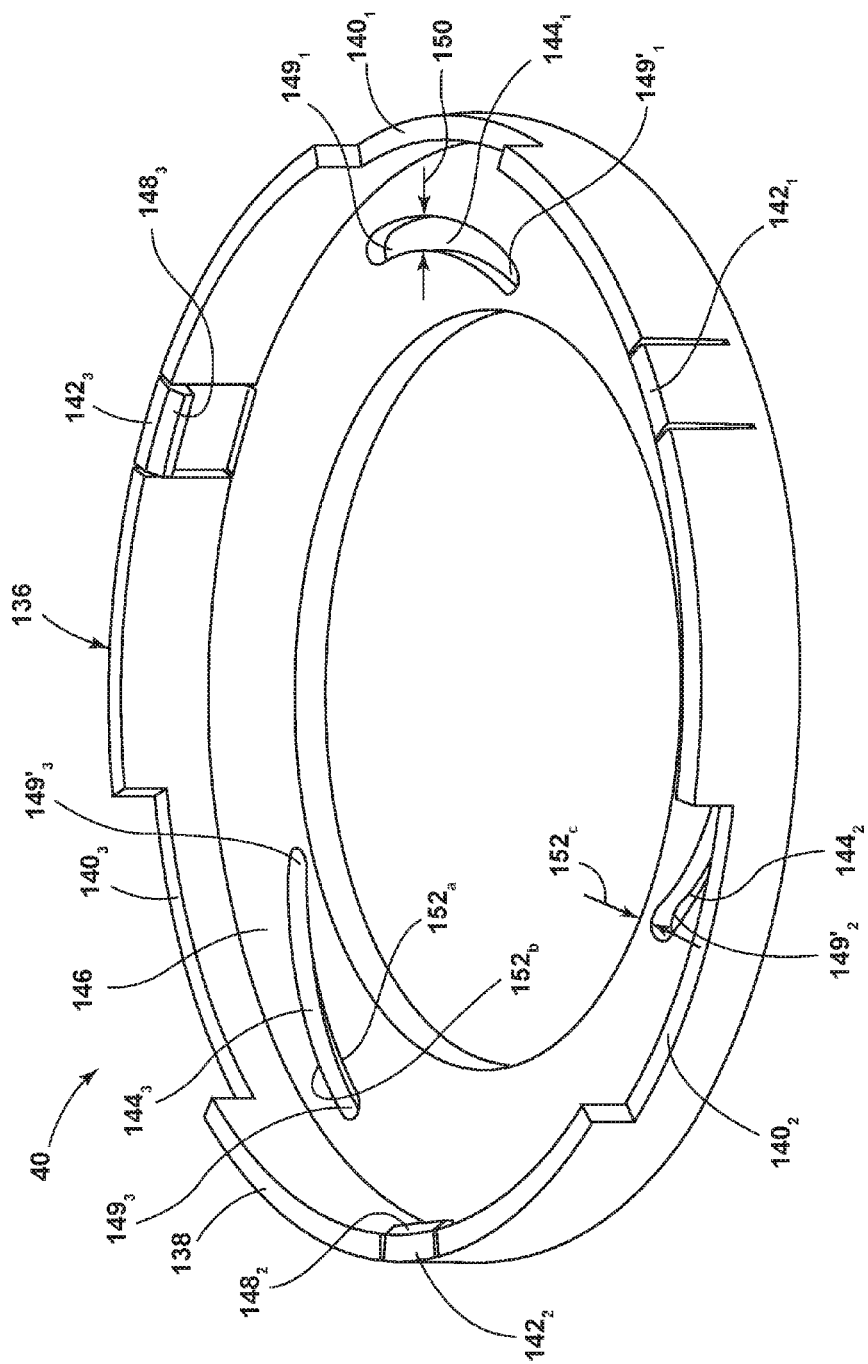
FIG. 7 is a bottom isometric view of a ring of the device of FIG. 1.

FIG. 7 is a bottom isometric view of actuator mechanism 24. Actuator mechanism 24 is configured to allow a user or system to move arms $32_{1-3}$, $34_{1-3}$ so as to assume one of the insertion position and the retaining position (or an intermediate position therebetween). In the illustrated embodiment, actuator mechanism 24 is a ring 136. Ring 136 may comprise an outer wall 138, slots $140_{1-3}$ disposed therein, attachment clips $142_{1-3}$, and actuating guides $144_{1-3}$ formed in a bottom surface 146 of ring 136. Slots $140_{1-3}$ may be arranged equidistantly around outer wall 138. Attachment clips $142_{1-3}$ may be configured to facilitate coupling of ring 136 to receptacle 26. Attachment clips $142_{1-3}$ may each have a projection $148_{1-3}$ that projects radially inwardly. Actuating guides $144_{1-3}$ are configured to engage with arms $32_{1-3}$, respectively. Actuating guides $144_{1-3}$ may each have longitudinal ends $149_{1-3}$, $149_{1-3}'$. In the illustrated embodiment, actuating guides $144_{1-3}$ are curved and are arranged circumferentially equidistantly on bottom surface 146 of ring 136. In an embodiment, actuating guides $144_{1-3}$ may have a width 150 of four millimeters, and longitudinal ends $149_{1-3}$, $149_{1-3}'$ may have an inner radius of curvature $152a$ of thirty-four millimeters and an outer radius $152b$ of curvature of thirty-eight millimeters. In one embodiment, a gap $152c$ between longitudinal end $149_{1-3}'$ and an inner edge of ring 136 may be two millimeters. Although specific dimensions are mentioned, one of ordinary skill in the art will understand that the dimensions, curvature, and positioning of actuating guides $144_{1-3}$ may have certain dependencies, namely, the size of arms $32_{1-3}$, the desired diameters for the retaining and insertion positions, and the effort needed from the user or system to actuate the device, among other things. Moreover, although actuating guides $144_{1-3}$ are illustrated as being identical in shape and size, actuating guides may be of different shapes and sizes, depending on the actuation desired.

Figure 8:
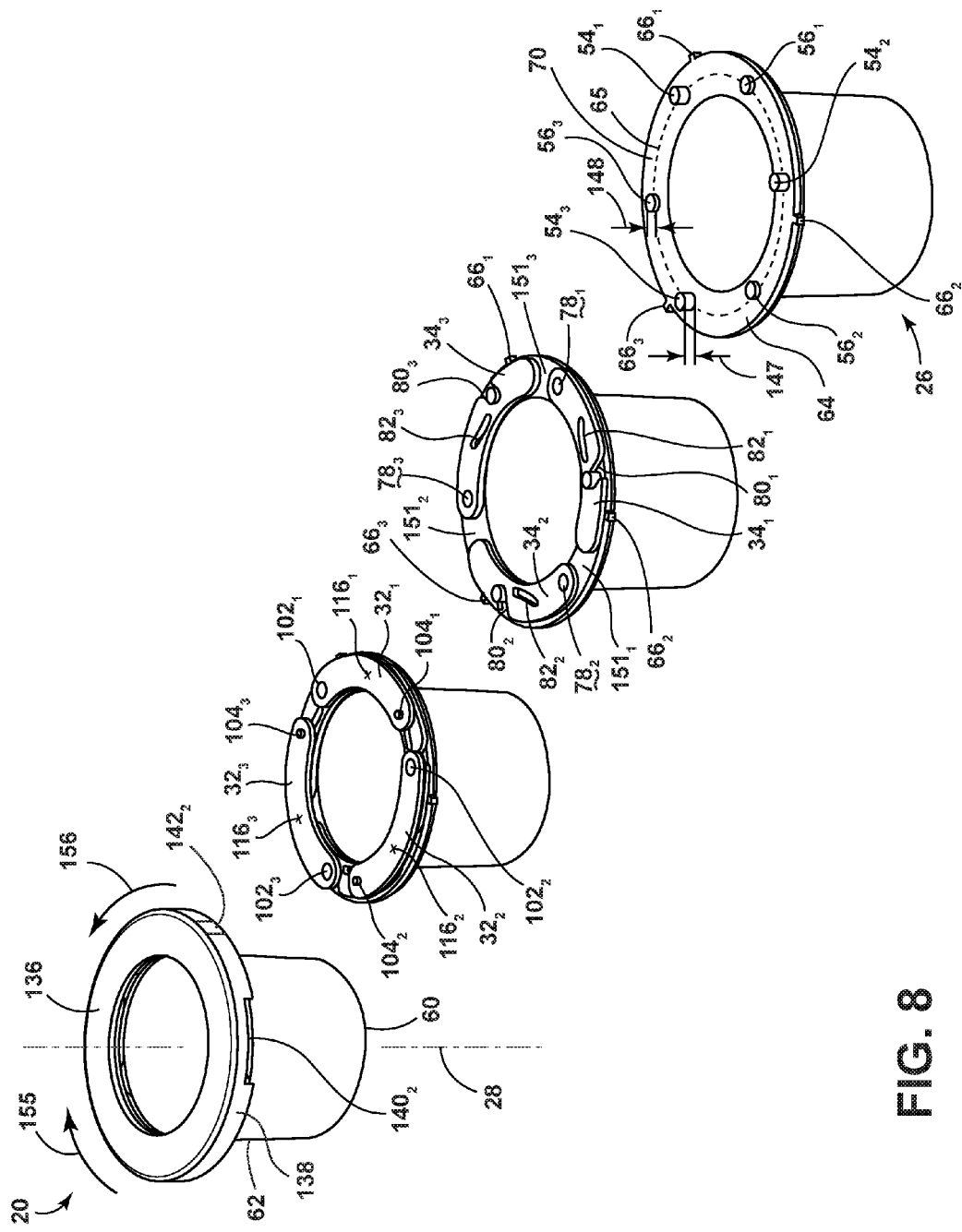
FIG. 8 illustrates the device of FIG. 1 in various stages of assembly.

A description of how the components of device 20 are assembled is now provided. FIG. 8 illustrates device 20 in various stages of assembly. Flange 64 of receptacle 26 may serve as the base for arms $32_{1-3}$, $34_{1-3}$ and for ring 136. Each pivot $54_{1-3}$, $56_{1-3}$ on flange 64 may extend through a corresponding arm $32_{1-3}$, $34_{1-3}$, respectively. In the illustrated embodiment, there are six pivots $54_{1-3}$, $56_{1-3}$, one for each arm $32_{1-3}$, $34_{1-3}$ of iris 30, respectively. In other embodiments, however, one pivot may extend through more than one arm (and serve as a pivot for those arms). Pivots $54_{1-3}$ may have a height 147 measured from top surface 70 of flange 64, and pivots $56_{1-3}$ may have a height 148 measured from top surface 70 of flange 64. In the illustrated embodiment, height 147 of pivots $54_{1-3}$ is greater than height 148 of pivots $56_{1-3}$ since pivots $54_{1-3}$ extend farther up to arms $32_{1-3}$. Also, in the illustrated embodiment, pivots $54_{1-3}$, $56_{1-3}$ all lie on a centered circumference 65 of flange 64, which is midway between the inner and outer diameters of flange 64. In other embodiments, however, pivots $54_{1-3}$, $56_{1-3}$ may be disposed at various points on flange 64, and may not lie on the same circumference.

Arms $34_{1-3}$ are coupled to flange 64 via insertion of pivots $56_{1-3}$ through apertures $78_{1-3}$ of arms $34_{1-3}$, respectively, and insertion of pivots $54_{1,2,3}$ through slots $80_{3,1,2}$, respectively. Slots $80_{1-3}$ may be configured to permit pivots $54_{1-3}$ to extend through arms $34_{1-3}$ to arms $32_{1-3}$ but may also be configured to aid in guiding arms $34_{1-3}$ upon actuation of ring 136. Once coupled, arms $34_{1-3}$ together extend circumferentially around a substantial portion of flange 64, leaving only gaps $151_{1-3}$. Arms $32_{1-3}$ are coupled to flange 64 and to arms $34_{1-3}$ via insertion of pivots $54_{1-3}$ through apertures $102_{1-3}$ of arms $32_{1-3}$, respectively, and insertion of arm cams $106_{1-3}$ of arms $32_{1-3}$ (FIGS. 6C-6D) in arm guides $82_{1-3}$ of arms $34_{1-3}$, respectively. In the illustrated embodiment, there are three arm guides $82_{1-3}$, and each arm guide $82_{1-3}$ corresponds to an arm cam $106_{1-3}$ of arm $32_{1-3}$ (FIGS. 6C-6D), respectively. Once coupled, arms $32_{1-3}$ together overlap a majority of the top surfaces of arms $34_{1-3}$ and also gaps $151_{1-3}$. Also, in the illustrated embodiment, the longitudinal ends of arms $32_{1-3}$ are offset from the longitudinal ends of arms $34_{1-3}$ such that midpoints $116_{1-3}$ of arms $32_{1-3}$ are disposed over gaps $151_{1-3}$. The size and number of gaps can vary; in some embodiments, there may be little to no gaps between the arms.

Still referring to FIG. 8, ring 136 is coupled to receptacle 26 by aligning actuating cams $104_{1-3}$ of arms $32_{1-3}$ with actuating guides $144_{1-3}$ (FIG. 7) of ring 136, respectively, and also by aligning stops $66_{1-3}$ of receptacle 26 with slots $140_{1-3}$ of ring 136, respectively. In the illustrated embodiment, there are three actuating guides $144_{1-3}$ (FIG. 7), and each actuating guide $144_{1-3}$ corresponds to an actuating cam $104_{1-3}$ of arm $32_{1-3}$, respectively. A tapered or radial lead-in may be provided on either actuating guides $144_{1-3}$ of ring 136, actuating cams $104_{1-3}$ of arms $32_{1-3}$, or both to allow assembly with minor misalignment. Ring 136 is also coupled to receptacle 26 via attachment clips $142_{1-3}$ which are integral with ring 136. Attachment clips $142_{1-3}$ will now be described in detail.

Figure 9:
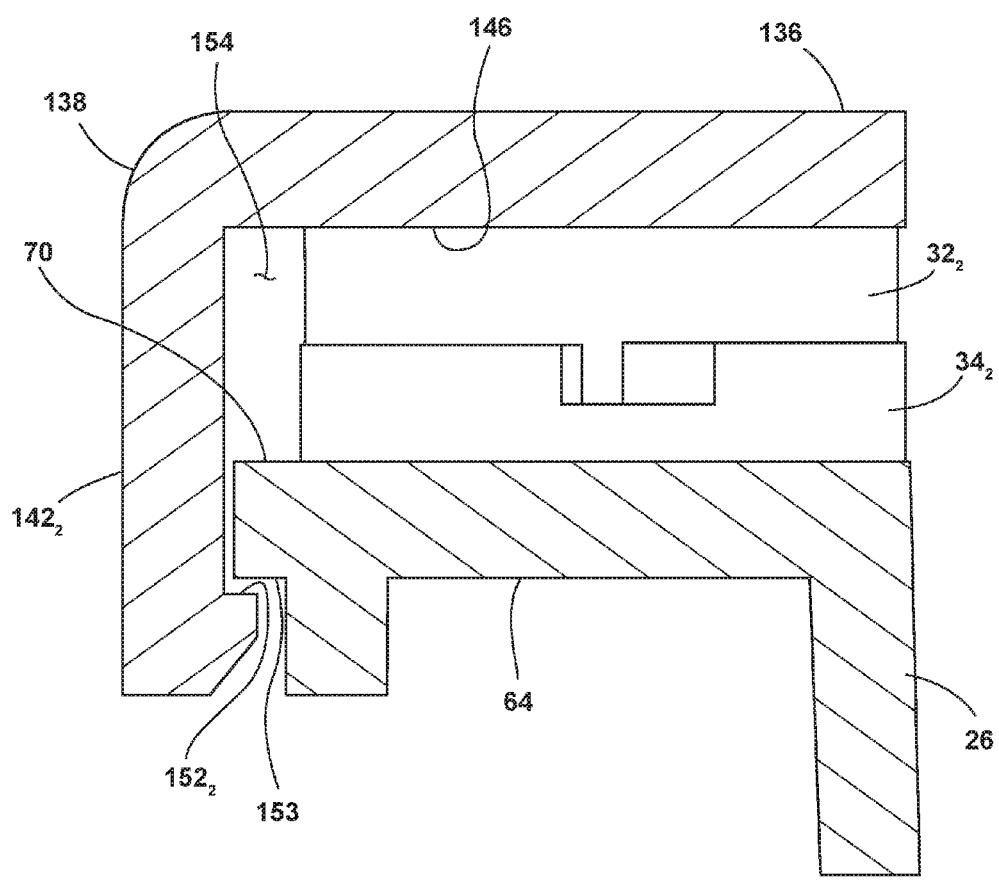
FIG. 9 is a partial, enlarged, cross-sectional view of a portion of the device of FIG. 1.

FIG. 9 is a partial, enlarged, cross-sectional view of a portion of device 20. As ring 136 is pushed over flange 64, clips $142_{1-3}$ bow radially outwardly and then snap radially inwardly such that surfaces $152_{1-3}$ of projections $142_{1-3}$ engage a lip 153 of flange 64. Once attached, outer wall 138 and bottom surface 146 of ring 136 and top surface 70 of flange 64 define a cavity 154 in which arms $32_{1-3}$, $34_{1-3}$ of iris 30 may reside when in the insertion position. Ring 136 may be decoupled from flange 64 by manually bowing clips $142_{1-3}$ radially outwardly and removing. In the illustrated embodiment, there are three attachment clips $142_{1-3}$; however, more or less clips may be used.

Figure 3B:
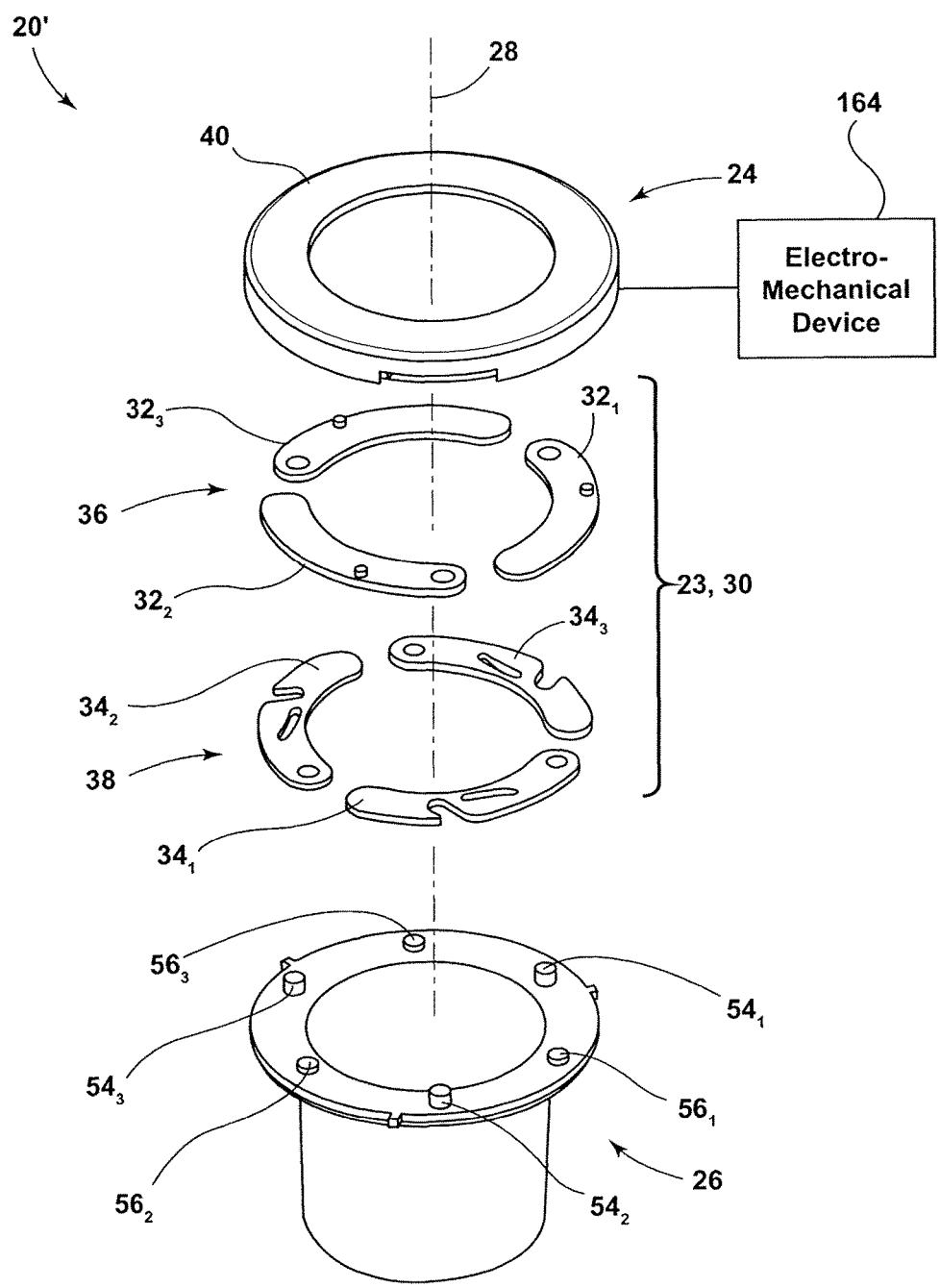
Figure 3C:
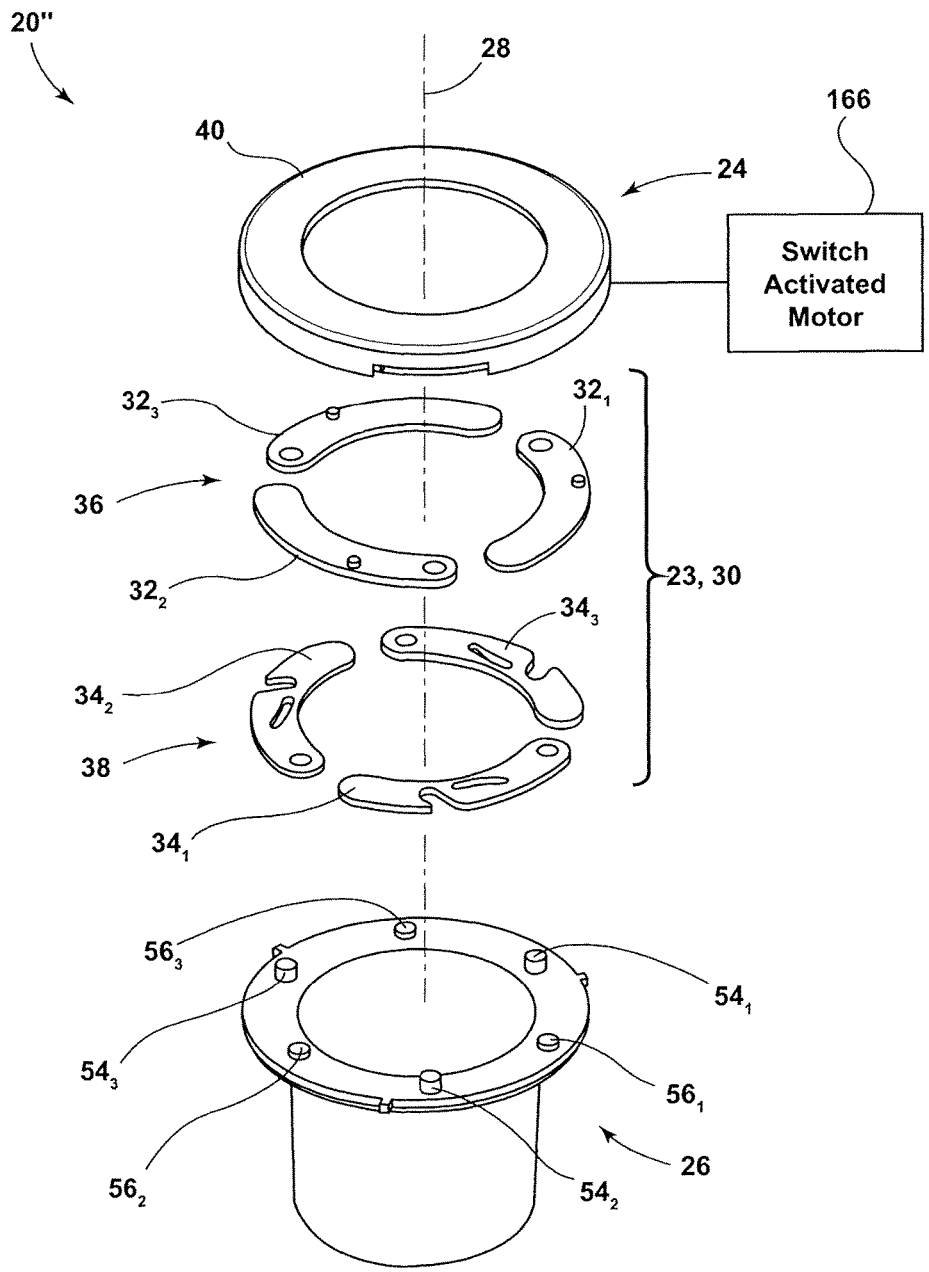
Figure 3D:
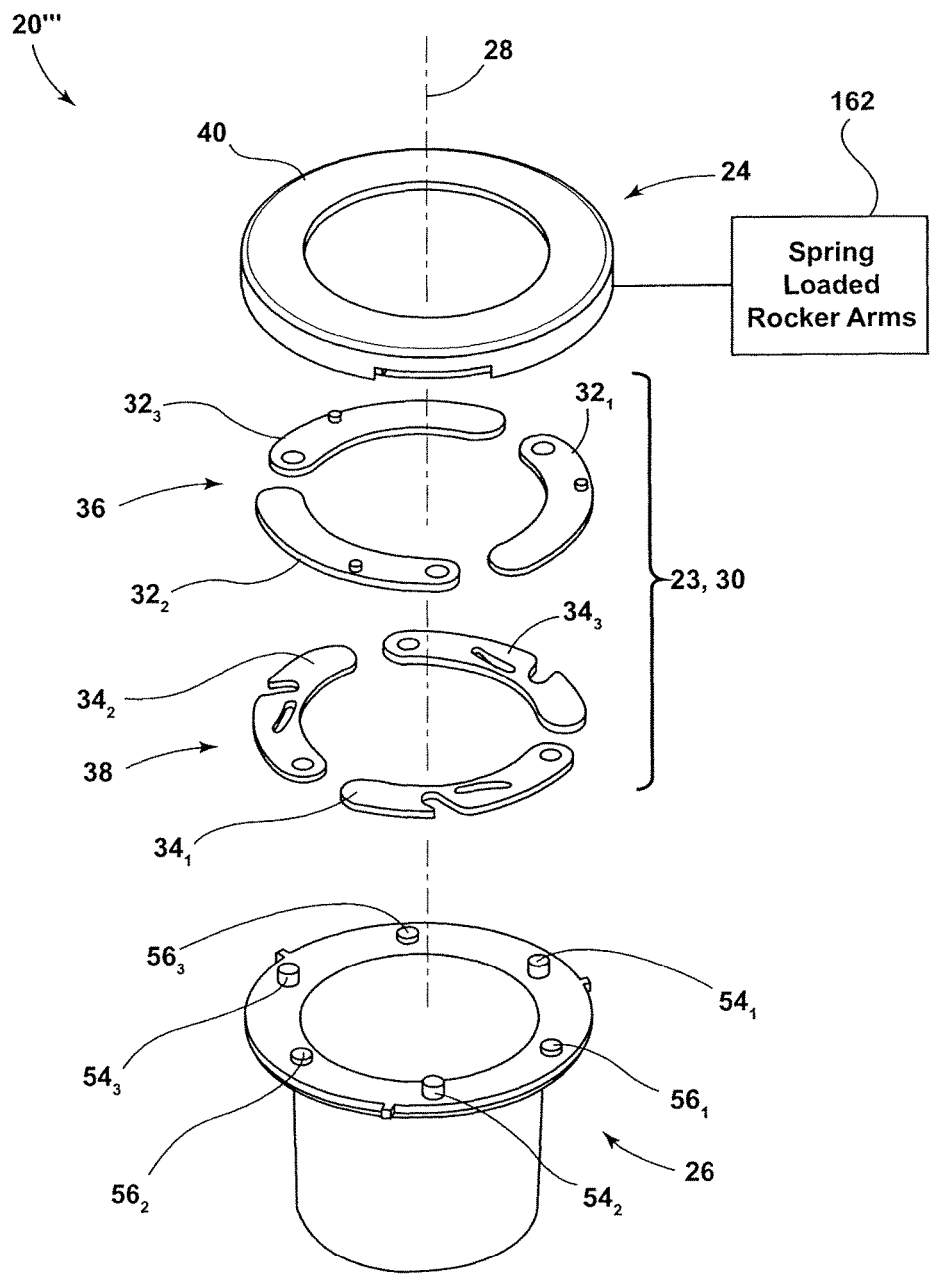

With continual reference to FIG. 8, a description of how device 20 operates will now be provided. In one embodiment, rotation of ring 136 in a first direction 155 causes arms $32_{1-3}$, $34_{1-3}$ of iris 30 to close down the size of central opening 21 (i.e., toward the retaining position) (as shown in FIG. 2). Additionally, rotation of ring 136 in a second opposite direction 156 causes arms $32_{1-3}$, $34_{1-3}$ of iris 30 to open up to increase the size of central opening 21 (i.e., toward the insertion position). In another embodiment, directions 155, 156 are reversed. Ring 136 may be manually rotated by the user or, alternatively, may be automated using mechanical devices (e.g., spring-loaded rocker arms 162—see device 20''' in FIG. 3D) or electro-mechanical devices 164—see device 20' in FIG. 3B (switch activated motor 166—see device 20'' in FIG. 3C). Although actuator mechanism 24 is illustrated as comprising ring 136, actuator mechanism 24 can take on other forms other than ring 136 (i.e., pivoting of arms $32_{1-3}$, $34_{1-3}$ can be actuated by other means).

As ring 136 rotates, actuating guides $144_{1-3}$ disposed on bottom surface 146 of ring 136 (FIG. 7) correspondingly rotate relative to axis 28. As such, the movement of actuating guides $144_{1-3}$ of ring 136 causes actuating cams $104_{1-3}$ of arms $32_{1-3}$ to move and travel within actuating guides $144_{1-3}$, respectively. Such travel causes arms $32_{1-3}$ to pivot relative to their respective pivots $54_{1-3}$.

Still referring to FIG. 8, as a result of such pivoting of arms $32_{1-3}$, arm cams $106_{1-3}$ on bottom surface $98_{1-3}$ of arms $32_{1-3}$ (FIGS. 6C-6D) move with their respective pivoting arm $32_{1-3}$ and travel within arm guides $82_{1-3}$ of arms $34_{1-3}$, respectively. Such travel causes arms $34_{1-3}$ to pivot relative to their respective pivots $56_{1-3}$. In addition, while arms $34_{1-3}$ pivot radially inwardly or outwardly, pivots $54_{1-3}$ for the adjacent arm $32_{1-3}$ (which extend through apertures $102_{1-3}$ of arms $32_{1-3}$) travel within slots $80_{1-3}$ of arms $34_{1-3}$. For example, in the illustrated embodiment, pivot $54_3$ extends through aperture $102_3$ of arm $32_3$ and travels within slot $80_2$ of arm $34_2$. Such travel of pivots $54_{1-3}$ within slots $80_{1-3}$ may aid in guiding the pivotal movement of arms $34_{1-3}$. Dissimilar materials with different coefficients of thermal expansion may be used on interfacing elements to avoid loss of clearance between guides or slots and cams or pivots over the operating temperature range.

Upon moving in either direction 155 or 156, ring 136 will come to a stop through the interaction of stops $66_{1-3}$ of flange 64 with slots $140_{1-3}$ of ring. Stops $66_{1-3}$ travel within slots $140_{1-3}$ until stops $66_{1-3}$ contact the respective endwalls of slots $140_{1-3}$. In the illustrated embodiment, ring 136 comprises three slots $140_{1-3}$; however, one of ordinary skill in the art will understand that ring 136 may comprise less or more than three stops $66_{1-3}$. Furthermore, the ratio of stops to slots may not be one-to-one. In addition, stops $66_{1-3}$ with or without slots $140_{1-3}$ may instead be disposed internally of outer wall 138 of ring 136.

In operation, arms $32_{1-3}$, $34_{1-3}$ move synchronously to close the clearance between the container and sidewall 62 of receptacle 26 and/or inner edge of ring 136, which generates a clean appearance from above and prevents objects from falling therebetween.

In the illustrated embodiment, flange 64 is stationary relative to ring 136 and iris 30. As such, pivots $54_{1-3}$, $56_{1-3}$ projecting axially from top surface 70 of flange 64 are also stationary relative to iris 30. Although flange 64 is illustrated as being integral with receptacle 26, one of ordinary skill in the art will understand that flange 64 may be a component separate from receptacle 26 and that the device 20 may be provided without the receptacle 26 and/or base 60 and be assembled into a separate cup holder as desired.

In the insertion position, actuating cams $104_{1-3}$ of arms $32_{1-3}$ are disposed at longitudinal ends $149_{1-3}$ of actuating guides $144_{1-3}$, respectively, in ring 136 (see FIG. 7 for longitudinal end $149_1$). In the retaining position, actuating cams $104_{1-3}$ are disposed at longitudinal ends $149_{1-3}'$ of actuating guides $144_{1-3}$ (see FIG. 7 for longitudinal end $149_1'$). Although longitudinal ends $149_{1-3}$, $149_{1-3}'$ correspond to the positions of actuating cams $104_{1-3}$ when device 20 is in the insertion and retaining positions, respectively, other positions within actuating guides $144_{1-3}$ may correspond to the insertion and retaining positions. Furthermore, although actuating guides $144_{1-3}$ are illustrated as being formed in ring 136 and actuating cams $104_{1-3}$ are illustrated as being disposed on arms $32_{1-3}$, one of ordinary skill in the art will understand that this arrangement may be reversed (i.e., actuating guides $144_{1-3}$ may be formed in arms $32_{1-3}$, and actuating cams $104_{1-3}$ may be disposed on ring 136).

With reference to FIG. 5B, in the insertion position, arm cam $106_1$ of arm $32_1$ is disposed at longitudinal end $88_1$ of arm guide $82_1$ of arm $34_1$; in the retaining position, arm cam $106_1$ is disposed at longitudinal end $88_1'$ of arm guide $82_1$ (arm cam $106_1$ shown in FIGS. 6C and 6D). In the illustrated embodiment, arm cams $106_{2,3}$ are similarly positioned in arm guides $82_{2,3}$ (when in the insertion and retaining positions). Although arm guides $82_{1-3}$ are illustrated as being formed in arms $34_{1-3}$, respectively, and arm cams $106_{1-3}$ are illustrated as being disposed on arms $32_{1-3}$, respectively, one of ordinary skill in the art will understand that this arrangement may be reversed (i.e., arm guides $82_{1-3}$ may be formed in arms $32_{1-3}$, and arm cams $106_1$ may be disposed on arm $34_{1-3}$).

In the illustrated embodiment, arms $32_{1-3}$ of level 36 and arms $34_{1-3}$ of level 38 define openings 21, 21' (and thus diameters 22, 22', shown in FIGS. 1 and 2), such that a substantial portion of each arm $32_{1-3}$, $34_{1-3}$ contacts the container or beverage. One of ordinary skill in the art will understand, however, that in other embodiments, either plurality of arms $32_{1-3}$ or plurality of arms $34_{1-3}$ may contact the container and define opening 21' (e.g., arms $32_{1-3}$ may actuate movement of arms $34_{1-3}$, respectively, but not contact the container). Furthermore, in the illustrated embodiment, the rotation of ring 136 actuates the movement of the arms $32_{1-3}$ of level 36, respectively, and arms $32_{1-3}$ correspondingly actuate movement of arms $34_{1-3}$ of level 38, respectively. One of ordinary skill in the art will understand, however, that the actuation flow may be reversed (i.e., ring 136 may actuate movement of arms $34_{1-3}$, and arms $34_{1-3}$ may actuate movement of arms $32_{1-3}$).

Furthermore, although the illustrated embodiment shows actuator mechanism 24 as being ring 40, which is in the topmost position (relative to iris 30), actuator mechanism 24 may be in the bottom-most position (relative to iris 30). For example and without limitation, actuator mechanism 24 may be receptacle 26 (or a portion thereof), and pivots $54_{1-3}$, $56_{1-3}$ may instead project axially downwardly from ring 40, which may be fixed relative to iris 30.

Although the illustrated embodiment generally illustrates two pairs of cams and guides for each pair of upper and lower arms (one pair associated with ring 136 and arm $32_1$, and another pair associated with arm $32_1$ and arm $34_1$), one of ordinary skill in the art will understand that more pairs of cams and guides may be utilized among the various components to facilitate the opening and closing of iris 30. Furthermore, other mechanical components may be utilized (other than cams and guides) to produce the same actuation flow from an actuator mechanism 24 to a two-level iris 30. Additionally, although iris 30 is illustrated as having two levels, more levels may be used.

Figure 10:
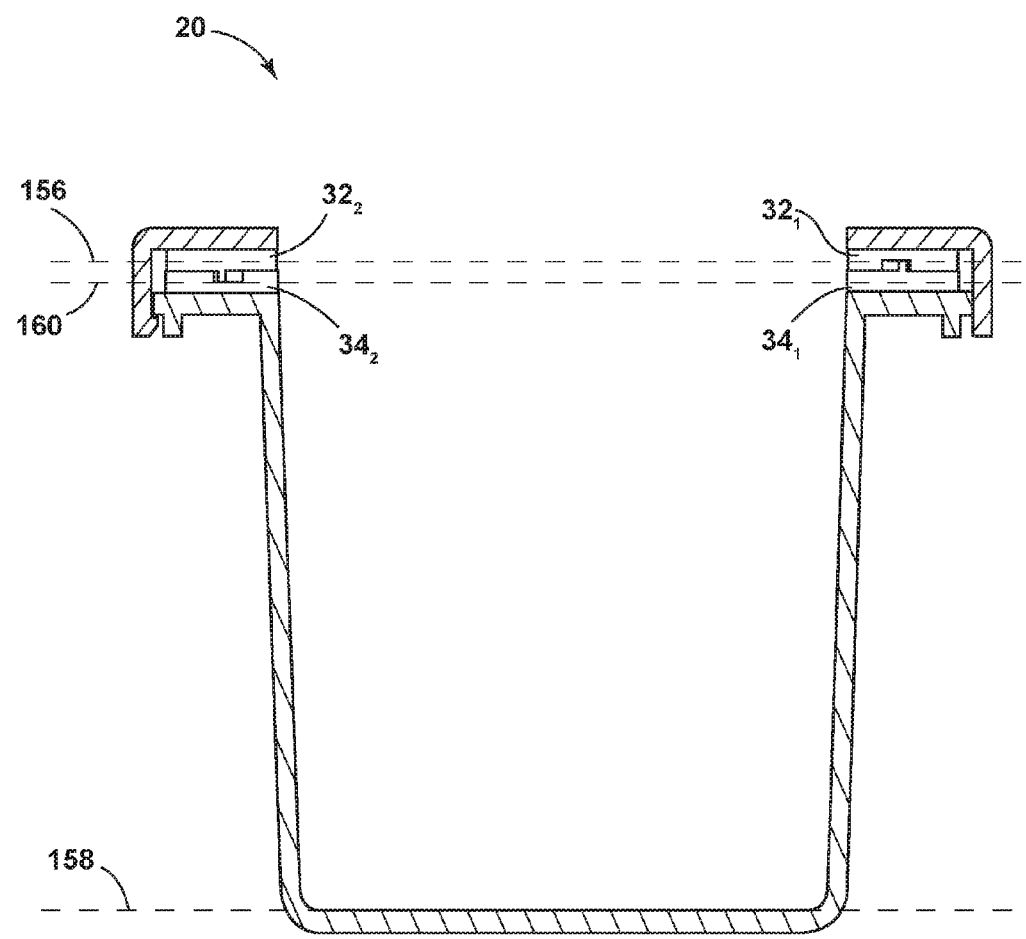
FIG. 10 is a simplified, partial, cross-sectional view of the device of FIG. 1 in the insertion position.

FIG. 10 is a simplified, partial, cross-sectional view of device 20 in the insertion position. As illustrated, arms $32_{1-3}$ may travel in a plane 156 parallel to a base plane 158, which is generally horizontal, and arms $34_{1-3}$ may travel in a plane 160 parallel to plane 156 (and to base plane 158). In other embodiments, arms $32_{1-3}$ and arms $34_{1-3}$ may travel in planes not parallel to each other or to base plane 158. For example and without limitation, planes 156, 160 may be at an angle relative to base plane 158.

The foregoing numerous embodiment solve one or more problems known in the art.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A device for holding a container, the device comprising:
a base configured to support the container;
an actuator mechanism; and
a retaining mechanism coupled to the actuator mechanism and configured to retain the container, the retaining mechanism comprising:
a longitudinal axis; and
an iris including a plurality of first-level arms arranged in a first level and a plurality of second-level arms arranged in a second level that is axially adjacent to the first level, wherein ends of adjacent first-level arms are spaced apart by respective gaps, said first-level arms having opposing top and bottom surfaces and said second-level arms having opposing top and bottom surfaces, wherein for each second-level arm, said bottom surface thereof engages said top surfaces of adjacent first-level arms such that said second-level arms overlap said gaps, and wherein the iris is moveable between an insertion position and a retaining position and wherein an opening formed by the iris in the insertion position has an insertion diameter greater than a retaining diameter of the opening in the retaining position,
wherein rotation of the actuator mechanism by one of a mechanical device and an electro-mechanical device in a first direction causes the arms of the iris to move to the retaining position and rotation of the actuator mechanism by said one of said mechanical device and said electro-mechanical device in a second direction opposite the first direction causes the arms of the iris to move away from the retaining position toward the insertion position.

2. The device of claim 1, wherein the actuator mechanism actuates movement of the arms in the first level of the iris, and the first-level arms in the first level actuates movement of the second-level arms in the second level of the iris.

3. The device of claim 1, wherein a first, first-level arm in the first level and a second, second-level arm in the second level pivot about first and second pivots, respectively.

4. The device of claim 3, wherein the first arm travels in a first plane parallel to the base, and the second arm travels in a second plane parallel to the first plane.

5. The device of claim 3, wherein the first and second pivots are fixed relative to the iris.

6. The device of claim 5, further comprising a receptacle including a flange and the base, wherein the first and second pivots are disposed on the flange.

7. The device of claim 6, wherein the first pivot extends through a first height as measured from the flange of the receptacle, the second pivot extends through a second height as measured from the flange, wherein said second height is greater than said first height.

8. The device of claim 3, wherein the first and second aims each comprise a respective aperture through which the first and second pivots extend, respectively.

9. The device of claim 3, wherein the first arm comprises a slot.

10. The device of claim 9, wherein the slot of the first arm extends radially inwardly from an outer edge of the first arm.

11. The device of claim 3, wherein the actuator mechanism comprises a ring with one of an actuating guide and an actuating cam, the first second arm comprises the other of the actuating guide and the actuating cam, and the actuating cam travels within the actuating guide upon rotation of the ring.

12. The device of claim 11, wherein the actuating guide is formed in a bottom surface of the ring, and the actuating cam is disposed on a top surface of the second arm.

13. The device of claim 3, wherein the second arm comprises one of a second arm guide and a second arm cam, the first arm comprises the other of the second arm guide and the second arm cam, and the second arm cam is configured to travel within the second arm guide upon actuation of the actuator mechanism.

14. The device of claim 13, wherein the second arm guide is formed in the top surface of the first arm, and the second arm cam is disposed on the bottom surface of the second arm.

15. The device of claim 14, wherein the second arm guide is a through hole that extends from the top surface of the first arm to the bottom surface of the first arm opposite the top surface.

16. The device of claim 14, wherein the second arm guide is disposed between first and second longitudinal ends of the first arm.

17. The device of claim 13, wherein an actuating cam is disposed at a first end of the second arm, and the second arm cam is disposed at a second end of the second arm opposite the first end, and the actuating cam is configured to travel within an actuating guide formed in the actuator mechanism.

18. The device of claim 13, wherein the plurality of arms further comprises a third, first-level arm in the first level and a fourth, second-level arm in the second level, and the third and fourth arms pivot about third and fourth pivots, respectively.

19. The device of claim 18, wherein the fourth pivot extends through a slot of the first arm.

20. The device of claim 18, wherein the plurality of arms further comprises a fifth, first-level arm in the first level and a sixth, second-level arm in the second level, and the fifth and sixth arms pivot about fifth and sixth pivots, respectively.

21. The device of claim 1, wherein mid-points of said second-level arms are disposed over respective gaps between adjacent first-level arms.

22. The device of claim 1, wherein rotation of the actuator mechanism is by said electro-mechanical device, said electro-mechanical device comprising a switch activated motor.

23. The device of claim 1, wherein rotation of the actuator mechanism is by said mechanical device, said mechanical device comprising spring-loaded rocker arms.

24. The device of claim 1, wherein rotation of the actuator mechanism is automated by said one of said mechanical device and said electro-mechanical device.

* * * * *

UNITED STATES PATENT AND TRADEMARK OFFICE
CERTIFICATE OF CORRECTION

PATENT NO. : 10,449,885 B2
APPLICATION NO. : 15/483207
DATED : October 22, 2019
INVENTOR(S) : Andrew L. Dargavell and James V. Gorman Page 1 of 1

It is certified that error appears in the above-identified patent and that said Letters Patent is hereby corrected as shown below:

In the Claims

Column 10, Line 26 (Claim 8), delete "aims" and insert --arms--, and Column 10, Line 35 (Claim 11), delete "first" before --second--.

Signed and Sealed this
Twenty-sixth Day of November, 2019

Andrei Iancu
*Director of the United States Patent and Trademark Office*